United States Patent
Nakajima et al.

(10) Patent No.: US 8,245,155 B2
(45) Date of Patent: Aug. 14, 2012

(54) COMPUTER IMPLEMENTED DISPLAY, GRAPHICAL USER INTERFACE, DESIGN AND METHOD INCLUDING SCROLLING FEATURES

(75) Inventors: Takeshi Nakajima, Tokyo (JP); Kenichi Nirei, Redwood City, CA (US); Yasuhiro Habara, San Diego, CA (US); Makoto Imamura, Tokyo (JP); Shinichi Iriya, Tokyo (JP); Takuo Ikeda, Santa Monica, CA (US); Daisuke Sato, Eindhoven (NL); Ryutaro Sakai, Los Angeles, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 475 days.

(21) Appl. No.: 12/242,279

(22) Filed: Sep. 30, 2008

(65) Prior Publication Data

US 2009/0144661 A1 Jun. 4, 2009

Related U.S. Application Data

(60) Provisional application No. 60/991,013, filed on Nov. 29, 2007.

(51) Int. Cl.
*G06F 3/048* (2006.01)
(52) U.S. Cl. ......... 715/833; 715/779; 715/835; 715/863
(58) Field of Classification Search .................. 715/835, 715/779, 833, 863
See application file for complete search history.

(56) References Cited

U.S. PATENT DOCUMENTS

| | | | |
|---|---|---|---|
| 6,337,698 B1 * | 1/2002 | Keely et al. | 715/823 |
| 6,792,615 B1 * | 9/2004 | Rowe et al. | 725/37 |
| 2006/0005131 A1 | 1/2006 | Tao | |
| 2006/0143574 A1 | 6/2006 | Ito et al. | |
| 2007/0146347 A1 | 6/2007 | Rosenberg | |
| 2007/0157105 A1 * | 7/2007 | Owens et al. | 715/771 |
| 2007/0252822 A1 * | 11/2007 | Kim et al. | 345/173 |
| 2008/0276200 A1 | 11/2008 | Bamford et al. | |

FOREIGN PATENT DOCUMENTS

| | | |
|---|---|---|
| JP | 2006/185273 | 7/2006 |
| JP | 2006-185275 | 7/2006 |
| JP | 2007-041641 | 2/2007 |
| WO | WO 01/93070 A2 | 12/2001 |
| WO | WO 2005/065111 A2 | 7/2005 |

OTHER PUBLICATIONS

U.S. Appl. No. 12/487,995, filed Sep. 19, 2009, Ikeda et al.
U.S. Appl. No. 12/794,484, filed Jun. 4, 2010, Iriya et al.
George Lawton, "These Are Not Your Father's Widgets", Computer, vol. 40, No. 7, Jul. 1, 2007, XP 011189983, pp. 10-13.

* cited by examiner

*Primary Examiner* — Andrey Belousov
(74) *Attorney, Agent, or Firm* — Oblon, Spivak, McClelland, Maier & Neustadt, L.L.P.

(57) ABSTRACT

An information processing apparatus includes a display unit and a control unit. The display unit is configured to display a dividing region dividing a main display region into two sub regions. The control unit is configured to control the display unit to display a plurality of icons in the dividing region, to change position of the dividing region in the main display region based on user input, and to display, when an icon of the plurality of icons is selected, information corresponding to the icon in at least one of the sub regions.

12 Claims, 24 Drawing Sheets

5: WIDGET 0/4 VIEW

4: WIDGET 1/4 VIEW

3: WIDGET 2/4 VIEW

2: WIDGET 3/4 VIEW

1: WIDGET 4/4 VIEW

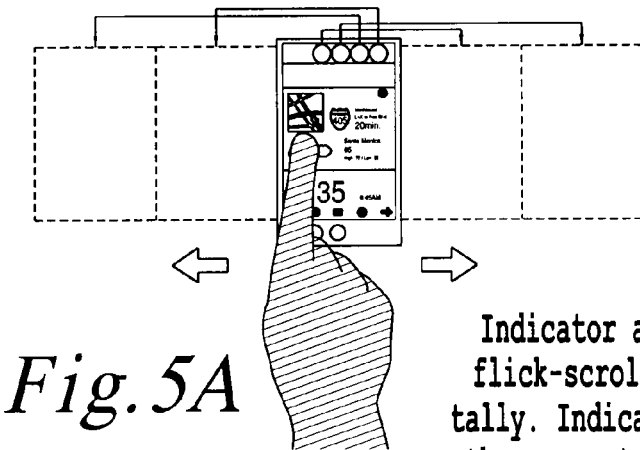
*Fig. 5A* — Indicator appears while flick-scrolling horizontally. Indicator highlights the current widget panel.
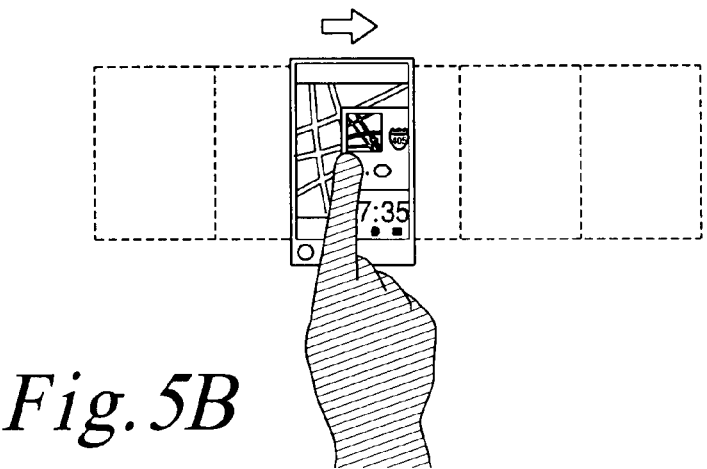
*Fig. 5B*
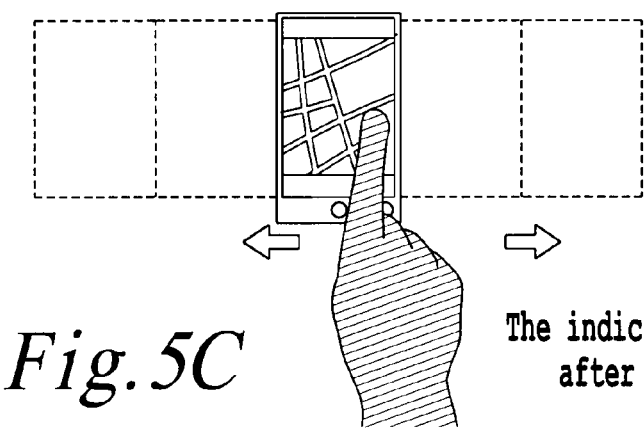
*Fig. 5C* — The indicator times out after 5 seconds.

| | Mon October 22, 2007 7:35am | | | | | |
|---|---|---|---|---|---|---|
| 👤 | 🕐 | ✉ | 🌐 | | | |
| 👨 | Mark | IM | SNS | ✉ | SMS | ☎ |
| 👤 | Park | | IM | ✉ | SMS | ☎ |
| 👨 | SI | IM | 👥 | ✉ | SMS | ☎ |
| 👨 | Ken | | IM | ✉ | SMS | ☎ |
| 👨 | Mike | IM | SNS | ✉ | SMS | ☎ |
| 👨 | Jack | | 👥 | ✉ | SMS | ☎ |
| 👤 | RS | | IM | ✉ | SMS | ☎ |
| 👤 | TNS | IM | 👥 | ✉ | SMS | ☎ |
| 👨 | Bart | | 👥 | ✉ | SMS | ☎ |
| 📶 | Office | SNS | 👥 | ✉ | SMS | ☎ |

🕐 View      ⋮⋮⋮ Dial Pad

Mon October 22, 2007 7:35am

10 | 10:00AM Conf. call with London
11 | 11:00AM Sales Mtg. | 11:00AM Q2 Review
12 |
1 | 1:00PM Conf. Call with N.Y.
2 |
3 |
4 | 4:00PM Call Jackie
5 |
6 |
7 | 7:00PM Write Check
8 |
9 | 9:00PM Play Time with Josh
10 |

≡ View     Action Menu

COMPUTER IMPLEMENTED DISPLAY, GRAPHICAL USER INTERFACE, DESIGN AND METHOD INCLUDING SCROLLING FEATURES

CROSS-REFERENCE TO RELATED APPLICATIONS

This application claims priority under 35 U.S.C. §119(e) to U.S. Provisional Application No. 60/991,013, filed Nov. 29, 2007, the entire contents of which is incorporated herein by reference.

FIELD OF THE INVENTION

The present invention relates to fixed or portable computing devices including graphical user interfaces. More particularly, the present invention relates to graphical user interfaces involving sub-dividable display regions that enable a user to navigate independently within the sub-dividable display regions.

BACKGROUND OF THE INVENTION

Computer systems conventionally use a graphical user interface (GUI) that allows for the display of various types of information. Some systems, such as MICROSOFT WINDOWS uses a desktop metaphor one which different icons are arranged, which allow a user to "point and click" on different icons to execute an application.

Example applications include word processing programs, web browsers, etc. The various icons may be selected by a user who selects different particular icons with through input from various computer input devices.

Some graphical user interfaces include touch panel displays that allow for the execution of certain applications, as a substitute for using a peripheral or built-in pointing device.

SUMMARY OF THE INVENTION

The present inventors recognize that conventional GUIs do not allow for the divisibility of the display region into separately "scrollable" display regions. The present inventors recognized that there is a logical connection of how information is presented to a user in a spatial context. However, conventional graphical user interfaces fail to take advantage of a human's memory to maintain a mental persistence of previously viewed material as it related to presently viewed material.

In a non-limiting example, the present invention allows for the division of a display area into multiple subdisplay regions by use of a launcher bar. Within one of the subregions, either above or below the launcher bar, additional information is displayed in logical arranged categories. Some of the categories of information, such as weather information is presented on the subdisplay region, but if the user scrolls in the subdisplay region to one side or the other, the user will be presented with the weather forecast for the next day, or the weather from the past days is subsequently presented to the user when the scroll is performed by "flicking" of the screen.

The graphical user interface of the present invention may be implemented in any one of a number of different computer-based devices. In one example the graphical user interface is implemented on a SmartPhone, that includes wireless connectivity features. However the invention is not so limited, as it may also be implemented in a number of other wired and wireless computer-based applications, including desktop or mobile computers, navigation systems, menu panels and touchscreens installed in automobiles, etc.

BRIEF DESCRIPTION OF THE DRAWINGS

FIG. 5 shows another succession of views showing how the screen may be scrolled horizontally through a flicking of the screen.

FIG. 12 is a screenshot showing a display of multiple contacts.

FIG. 14 is a screenshot showing a display of multiple e-mails.

FIG. 16 is a screenshot showing an appointment schedule.

FIG. 22 is a screenshot showing horizontal scrolling all of the widgets.

DETAILED DESCRIPTION OF THE PREFERRED EMBODIMENTS

Figure 1:
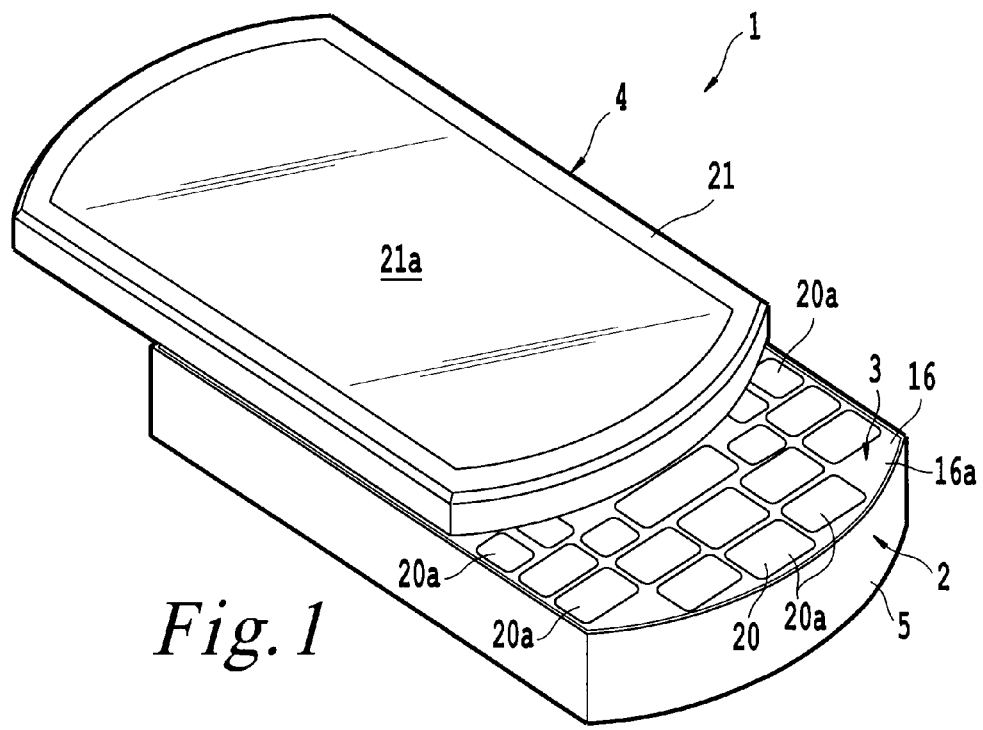
FIG. 1 is a perspective view of a SmartPhone embodiment of a computing device that uses a GUI according to the present invention.

Referring now to the drawings, wherein like reference numerals designate identical or corresponding parts throughout the several views.

FIG. 1 shows a perspective view of a smart phone 1 according one embodiment of the present invention. The smart phone 1 (or information processing apparatus) includes a base unit 2 that host thereon an intermediate body 3 that is covered by a cover body 4. Hosted on the cover body 4 is a display unit 21A that displays the GUI shown on FIG. 3. On the intermediate body 3 are included a set of input keys 20 and 20A for inputting data into the information processing apparatus 1. The information processing apparatus 1 includes a GPS receiver, as well as wireless communication capability for communicating over mobile networks. Although not shown, electrical interfaces are included that allow for the exchange of information from the information processing apparatus 1 to auxiliary devices and/or a network. Such example interfaces includes USB, HDMI, IEEE 1291, etc.

The display unit 21A includes a touch screen that enables a user to have his or her selection recognized by the display unit 21A when touching the display unit 21A with his or her figure, or other pointing instrument. Alternatively, the information display apparatus 1 may allow for a user to use a remote pointing device, either wired or wirelessly connected to the information processing apparatus 1. The remote pointing devices enables the user to perform scrolling apparitions and execution of applications, by pointing and selecting different widgets, or information items that would otherwise be selected or scrolled by using the touching of ones finger on the touch panel of display unit 21A.

The wireless connection can be made with infrared, or RF remote capability, such as using a Bluetooth interface. A wired remote control head may also be used that would allow for the user to hold the remote pointing device in the users hand when used. Alternatively, the device could be built into a convenient location such as the steering wheel of an automobile. The remote pointing device would allow the user to visually observe the GUI on a display screen, such as a screen mounted on a car's dashboard, but would avoid the need for the user to reach over and make physical contact with the screen in order to input a selection or navigate in the GUI. Because the user can operate the GUI without having to extend his arm and reach the screen on the dashboard, it is much safer to operate the car during normal operations.

Figure 3:
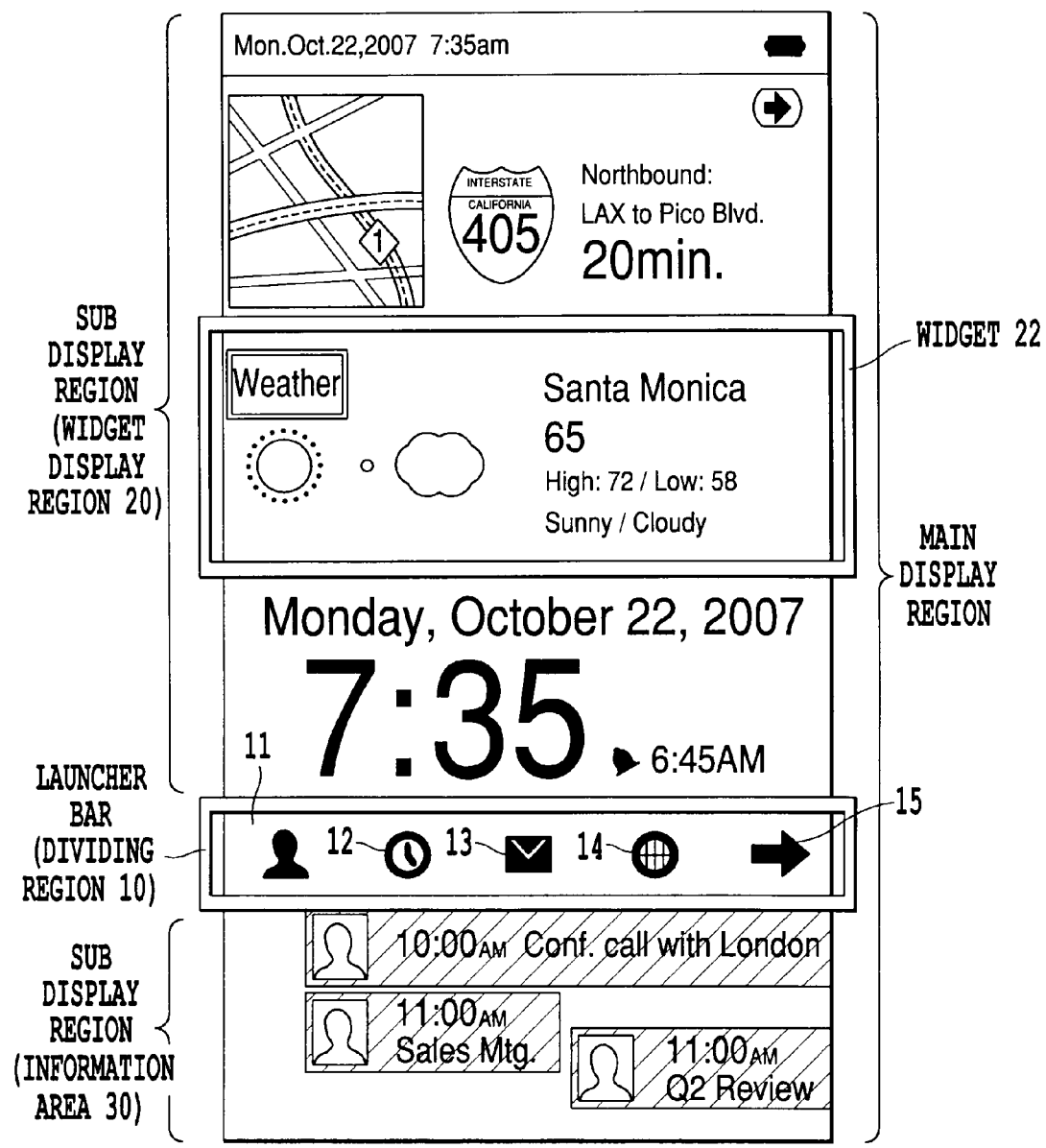
FIG. 3 is a graphical user interface that helps illustrate the different terminology used herein.
Figure 4E:
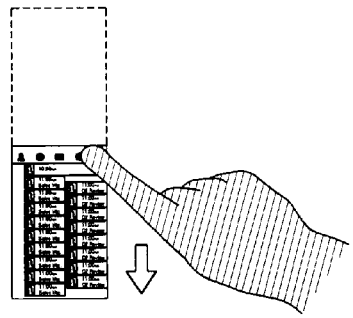
FIG. 4 shows a succession of different views for how scrolling may be achieved through the "flick" of one's finger across a screen in a vertical direction.
Figure 4D:
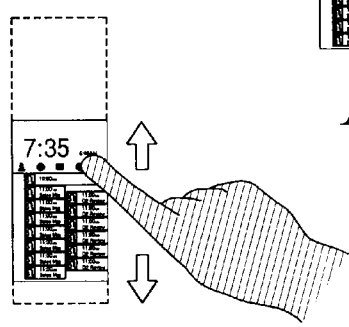
Figure 4C:
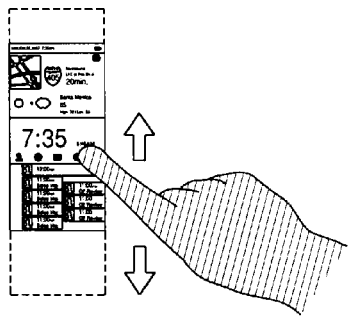
Figure 4B:
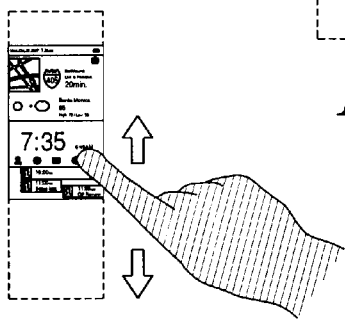
Figure 4A:
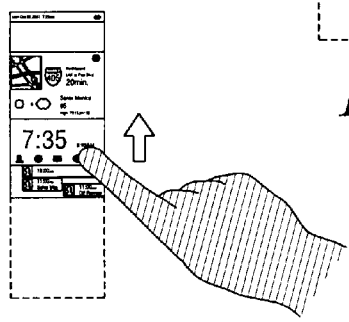

The information processing apparatus 1 includes a wireless capability, such as Bluetooth, that allows for the pairing of the information processing apparatus 1 to other accessible monitors. For example in the context of an automobile, the apparatus 1 is capable of providing a Bluetooth connectivity to the display panel such that the GUI of FIG. 3 is visible on the dashboard display panel. Information contained in the information processing apparatus 1, or the accessibility to other network information through the information processing apparatus 1, is made available for display on the dashboard display panel by way of the Bluetooth connection. The present inventors have recognized that this can be a much safer way to operate different navigation systems or other computer based display and input system when driving ones automobile.

Figure 2:
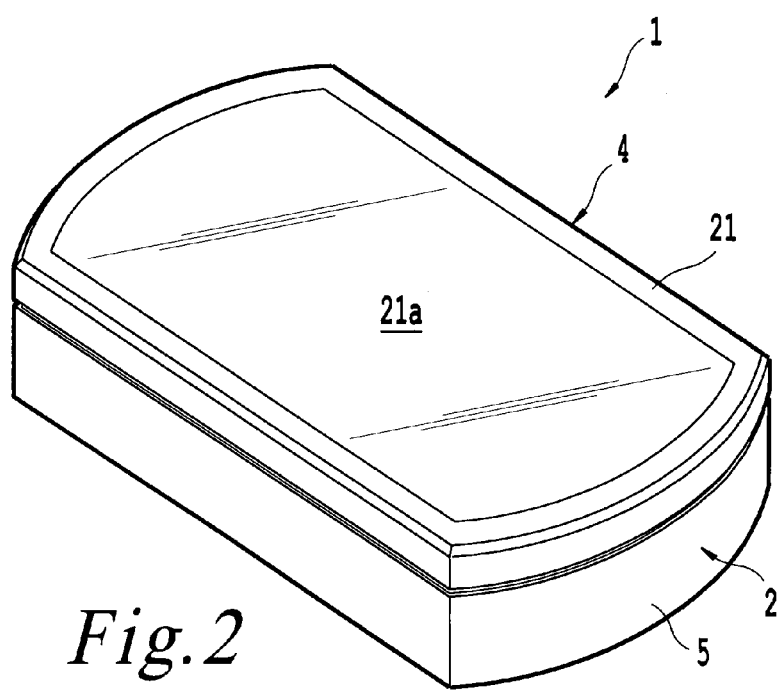
FIG. 2 shows another prospective view of the information processing apparatus of FIG. 1.

FIG. 2 shows another perspective view of the information processing apparatus 1, although the cover body 4 is made to cover the base unit 2. Moreover, the information processing apparatus 1 in FIG. 2 as shown to be in a closed position. Because the apparatus 1 has a mobile telephone capability, the user is able to use the apparatus as a cellular telephone, as well as for other functions, such as a MP3 player, camera, web browser, etc.

FIG. 3 shows a main display region of a GUI displayed on a display, such as a LCD, plasma, CRT, LED or other type of unit capable of visually presenting computer-produced imagines of text and/or graphics. The main display region may be implemented as a touch panel that allows for human interaction with the main display region. However, in another embodiment, a touch panel is not required and the interaction with the GUI may be implemented through a pointing device for remote operation that does not require touching of the main display region itself. Example pointing devices include a mouse, trackball, jog-dial, touchpad, sensor pad, etc., each adapted to allow a human to interact with the pointing device so as to select and or scroll/"flick" content displayed on the display. The pointing device need not require tactile input, but rather may also allow for pointing/scrolling/selection to be done by way of eye movement detection by having an integrated or peripheral eye movement detection device. The eye movement detection device is particularly helpful in the context of using the display in an automotive setting, where it is safer for the driver to keep both of his hands on the steering wheel, while visually interacting with the GUI displayed on the display device.

However in the present example, in FIG. 3 the main display region is displayed on a touch panel display and the main display region is separated into a widget display region 20 (sometimes referred to as "sub-display region"), launcher bar 10 (sometimes referred to as "dividing region"), and information area 30 (sometimes referred to as "sub-display region"). Within the main display region, the launcher bar 10 separates the widget display area 20 from the information area 30. The launcher bar is movable through a dragging operation (in this embodiment the user drags his finger from on top of the launcher bar to another location) so as to change the ratio of the widget display region 20 and the information area 30. In particular, in the present touch screen embodiment, the launcher bar region 10 may be moved upwards by the user touching one of the icons 10, 11, 12, 13, 14 or 15, and then dragging the user's finger in an upwards direction. The main display region will then show the launcher bar 10 following the user's finger in an upwards direction so as to reduce the size of the widget display region 20, and increase the size of the information area 30.

Each of the icons 10-15 are described in a different section that follows. However each of the icons 10-15 represents a different function such that when touched, displays information associated with the icon, or launches an application associated with that particular icon, such as an e-mail operation. In the widget display region 20, a particular widget, 22, which is shown to be a weather graphic, is displayed in combination with other widgets in the widget display region 20.

Within either of the widget display region 20, and/or information area 30, the user has the option for scrolling either vertically or horizontally. The scrolling operation is performed by "flicking" the screen, which is executed by the user dragging his finger across the screen (see e.g., FIGS. 4 and 5). For example, when the user places his or her finger on the widget 22 and then flicks the user's finger in an upward or downward direction within either the widget display region 20, or the information area 30, the newly displayed information is a same kind of information (e.g., same category of information). In one example, the same kind of information is a next day in a schedule, or a next contact person of a list of contact persons. On the other hand, when the display is flicked either to the right side or to the left side, the display is changed to show a different kind of information. In this way, the operator recognizes with the operator's own memory (i.e., what the user remembers or what the user can intuitively imagine will appear) the relationship between scrolling up or down so as to stay within a particular category, or scrolling to the right or left in order to change the type of information.

For example with respect to the widget display region 20, a region 22 is one of a plurality of different widgets that is displayed. When displayed as a widget, typically a "small" application that does not require a significant amount of memory (such as a listing of movies, music, weather information, stock market information, travel information, navigation information) is displayed in the widget display region 20. The display information is displayed as part of setting information such as a number, kind, size, position information of the widget. Further, in one embodiment, when a widget is selected, a webpage which includes detailed information regarding the widget is displayed.

There are several types of setting information, mostly related to time and/or position. The apparatus that displays the GUI of FIG. 3 is able to read the time setting information (e.g., a previously saved time, set the a user, or set as a default value based on a time zone that the unit can recognize based on position information from a built in, or remote, GPS function) and compare the present time and/or position information with the current time or position. The apparatus is then able to decide which widget should be displayed automatically. As an example, early in the morning, the user may choose to have weather information, time information, and traffic information displayed. However at a later time during the day, the information may switch to something that is more useful for that particular user at that particular time of day, such as access to a word processing program, spreadsheet program, e-mail, etc. In the evening, the user may choose to have displayed topical information such as sports information, etc., that is of particular interest to that user.

The underlying device that hosts the GUI includes a GPS data reception function. As discussed above, the apparatus having the display may include the GPS receiver or the location information may be provided remotely, or input via user entry into the device. Nevertheless, by understanding its present position, the device may connect to a network, either wired or wirelessly, to obtain information related to that particular location. Such information may be traffic information, weather information, time information including time zone, etc.

The information area 30, which in FIG. 3 is displayed underneath the launcher bar, includes various information such as contact list, mailbox, the individual's schedule, or an RSS reader, or a menu selection display for selecting other types of displays. The selection of different icons is made by clicking or touching one of the icons (or tabs) displayed on the launcher bar or flicking the display to the right or left so as to obtain other icons for execution.

When the user scrolls either up or down inside of the upper side region, the display information is scrolled in units of the widget. Therefore, if in the scrolling operation, only a portion of the widget is displayed, the system will continue to move that widget until either all of it or none of it is displayed. Further, the user may slide (or drag) the launcher bar so as to display information that is scrolled in units of the widget.

In one example, when a user gets new mail, the launcher bar 10 moves up automatically and shows a greater portion of the information area 30 so that the mail may be displayed. The user will then be able to recognize the abstract or subject line of the mail, thus allowing the user to recognize the existence of such mail as soon as possible.

The user may also stop the changing of the display information in the middle of scrolling to the left or right so that the apparatus displays larger information automatically.

FIG. 4 shows a related of series of 5 figures. The brightly colored portion of each figure shows the actual display area of the GUI. In widget 4/4 view, the display shows the upper most portion of the widget display region 20, and none of the sub-display region (information area 30). However as the user touches the launcher bar 10 and drags his or her finger in a downward direction, a portion of the widgets of the widget display region 20 are reduced in size, while the portion of the display that is allocated for the information area 30 is increased. As shown in widget 2/4 view, the uppermost widget showing the traffic information is now removed from sight, as additionally a greater portion of the information area 30 is shown. Widget 1/4 view shows the situation where the user continues to drag his or her finger in a downward direction so that another of the widgets in the widget display region 20 is removed. Finally, the widget 0/4 view shows a bottom-most position of the GUI, such that none of the widget display region 20 is shown above the launcher bar 10.

Nevertheless, as can be imagined based on the organization of the series of figures shown in FIG. 4, the user nevertheless will be able to remember the previous locations of the widgets in the widget display region 20. Therefore, it is relatively straight forward and easy for the user to remember how to navigate back to the widget display region 20, and the particular widgets that were of interest to that user.

FIG. 5 is similar to FIG. 4, although it shows how scrolling can be performed horizontally by flicking ones finger across the display region of the GUI. As shown 5 different panels are present, with only the middle panel being shown in bright colors. An indicator is shown to illustrate which of pages 1-5 is presented while flicking-scrolling horizontally. The indicator highlights the current widget panels so the user has an intuitive feel for where the present panel is located relative to the other panels. As seen, the page 5 panel in the second figure in the series is begun to be shown as the user moves his or her finger towards the right portion FIG. 5. Subsequently, in the last portion of FIG. 5, the full portion of panel 5 is shown. After a predetermined interval time (e.g. 3 second) the indicator turns off and is no longer displayed. In one embodiment, the panel includes a plurality of widgets relating to a single category.

Figure 6:
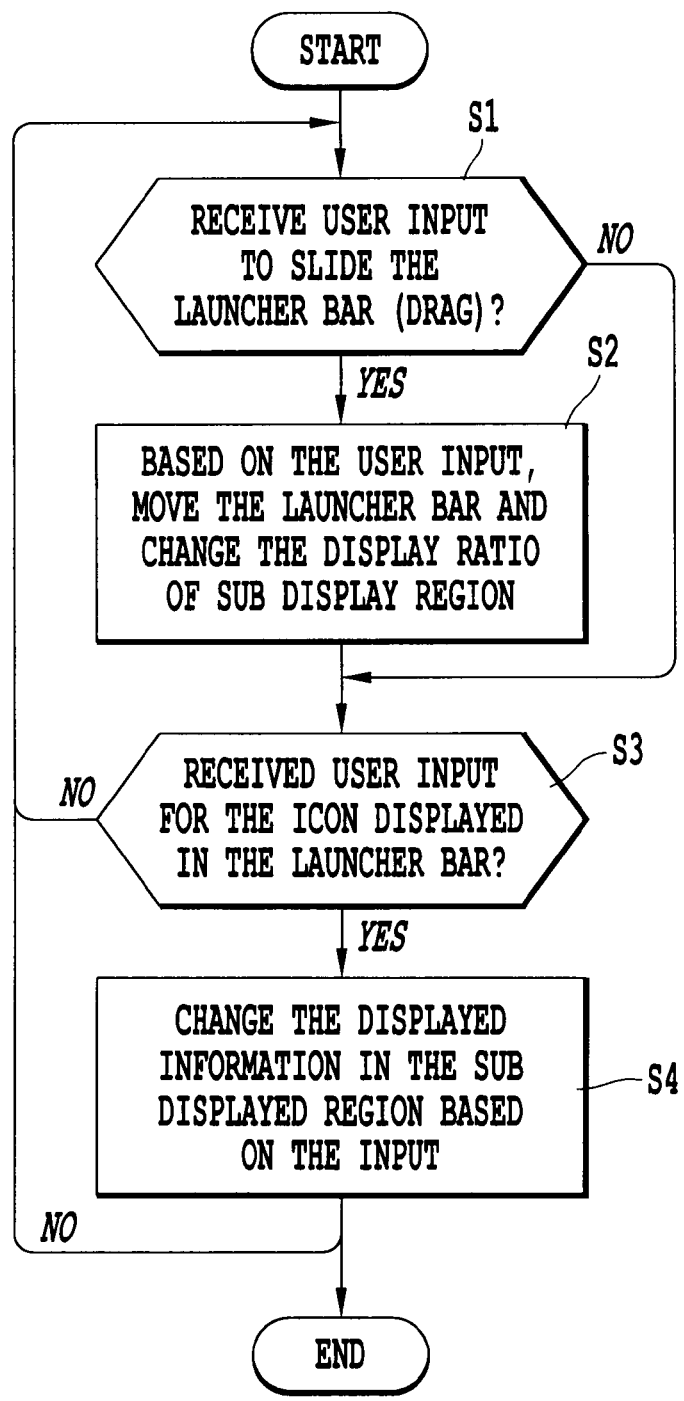
FIG. 6 is a flowchart showing a process flow of how either a vertical or horizontal scrolling operation is performed according to the present invention.

FIG. 6 is a flowchart showing how a user interacts with the GUI of FIG. 3. The process starts in step S1 where an inquiry is made regarding whether the device receives the user input to side the launcher bar. If the response to the inquiry in step S1 is negative, the process proceeds to Step S3. However if the response to the inquiry in step S1 is affirmative, the process proceeds to Step S2, where based on the user input, the launch bar is shown to be moved so as to change the display ratio of the widget display region 20 in the information area 30. Subsequently the process proceeds to step S3 where another inquiry is made regarding whether the user input is received for an icon displayed on the launcher bar. If the response to the inquiry is negative, the process returns the Step S1. However if the response to the inquiry in step S3 is affirmative, the process proceeds to Step S4 where displayed information in the information area 30 is changed based on the input received from the user. The process proceeds to Step S1 unless power is turned off at which the process ends.

Figure 7:
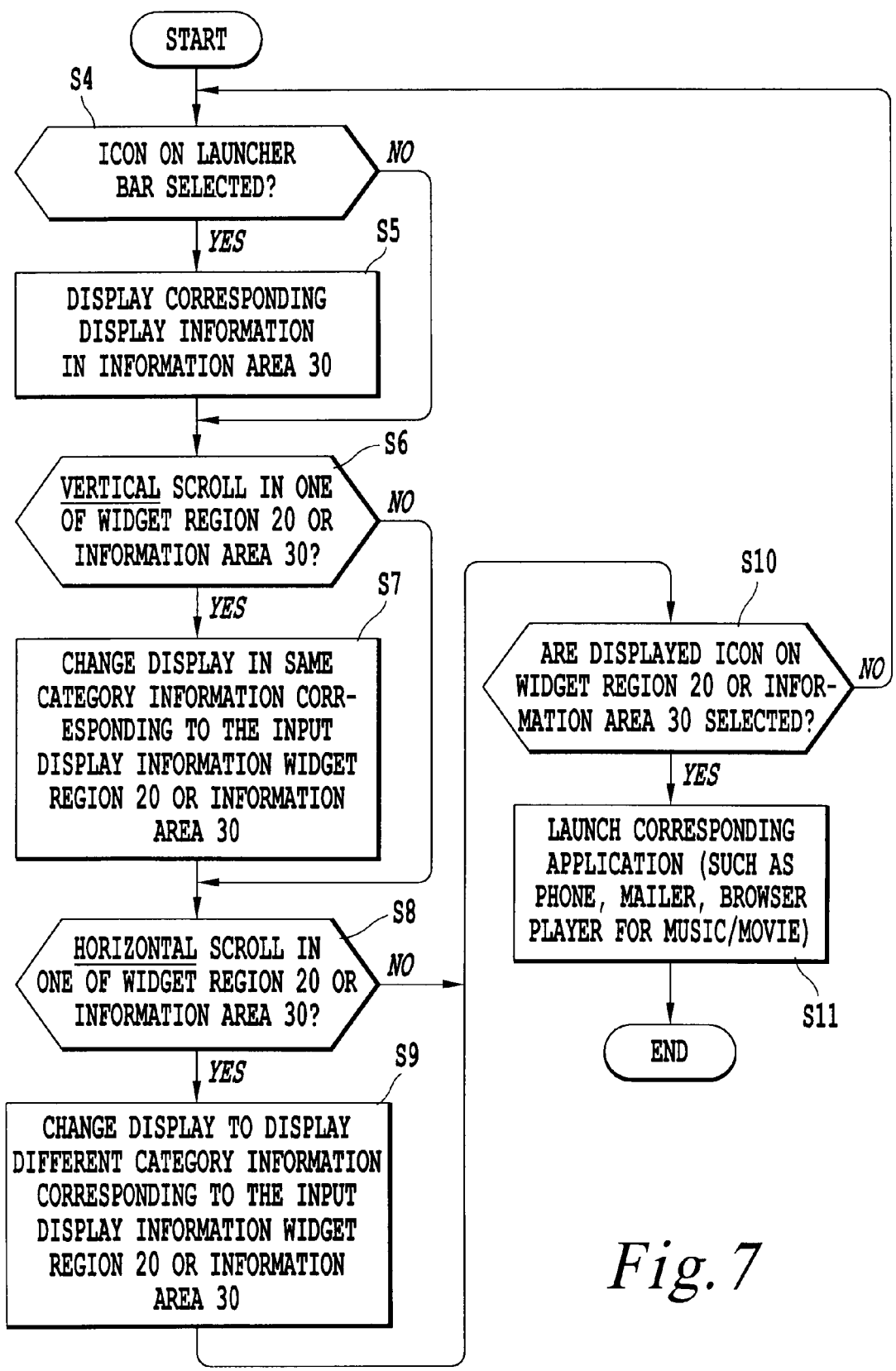
FIG. 7 is a flow chart showing the process of scrolling widget region and information area.

FIG. 7 shows a flowchart illustrating the process of scrolling widget region 20 and information area 30 and selecting applications for apparatus 11. In step S4, apparatus 11 determines if an icon on the launcher bar 10 is selected. If so, apparatus 11 displays the corresponding display information in information area 30 in step S5, and then proceeds to step S6. If not, apparatus 11 skips to step S6 where it determines if the user wishes to vertically scroll one of widget region 20 or information area 30. If so, apparatus 11 changes the display corresponding to widget region 20 or information area 30 in step S7 and then proceeds to step S8. If not, apparatus 11 skips to step S8 where it determines if the user wishes to horizontally scroll one of widget region 20 or information area 30. If so, apparatus 11 changes the display corresponding to widget region 20 or information area 30 in step S9 and then proceeds to step S10. If not, apparatus 11 skips to step S10 where it determines if the user has selected a displayed icon. If so, apparatus 11 launches the corresponding application in step S11 and ends the process. If not, apparatus 11 returns to step S4.

Figure 8:
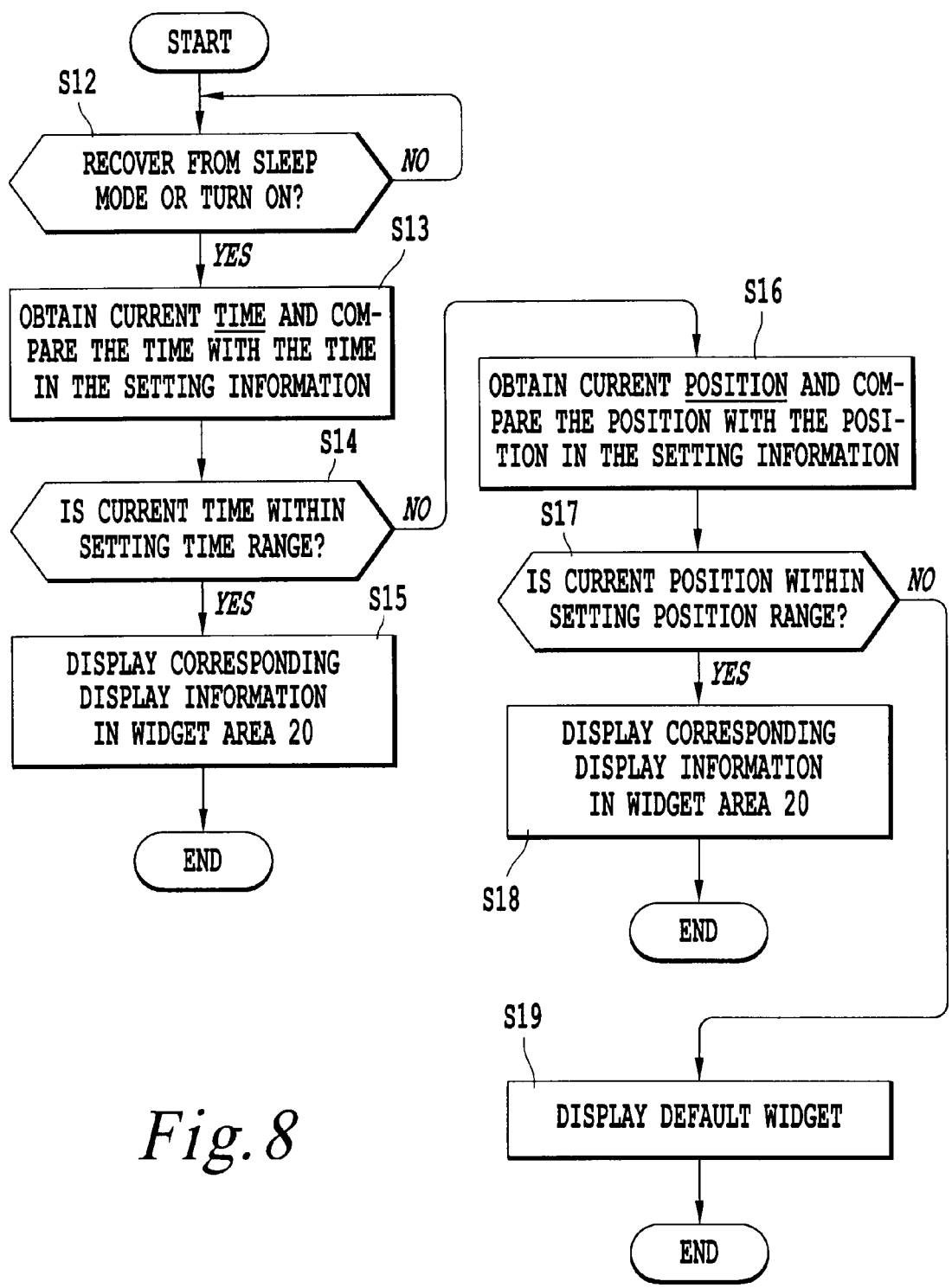
FIG. 8 is a flowchart showing the process of displaying start up information.

FIG. 8 shows a process for displaying start up information for apparatus 11. In step S12, apparatus 11 determines if it is recovering from sleep mode or it has been turned on. If not, it returns to step S12. If so, apparatus 11 proceeds to step S13 where it obtains the current time and compares it with a time in the setting information. Apparatus 11 determines in step S14 if the current time is within the setting time range. If so, apparatus 11 displays corresponding display information in widget area 20 in step S15, and ends the process. If not, apparatus 11 obtains current position information and compares it with the position in the setting information in step S16. Apparatus 11 determines in step S17 if the current position is within the setting position range. If so, apparatus 11 displays corresponding display information in widget area 20 in step S18, and ends the process. If not, apparatus 11 displays a default widget in step S19 and ends the process.

Figure 9:
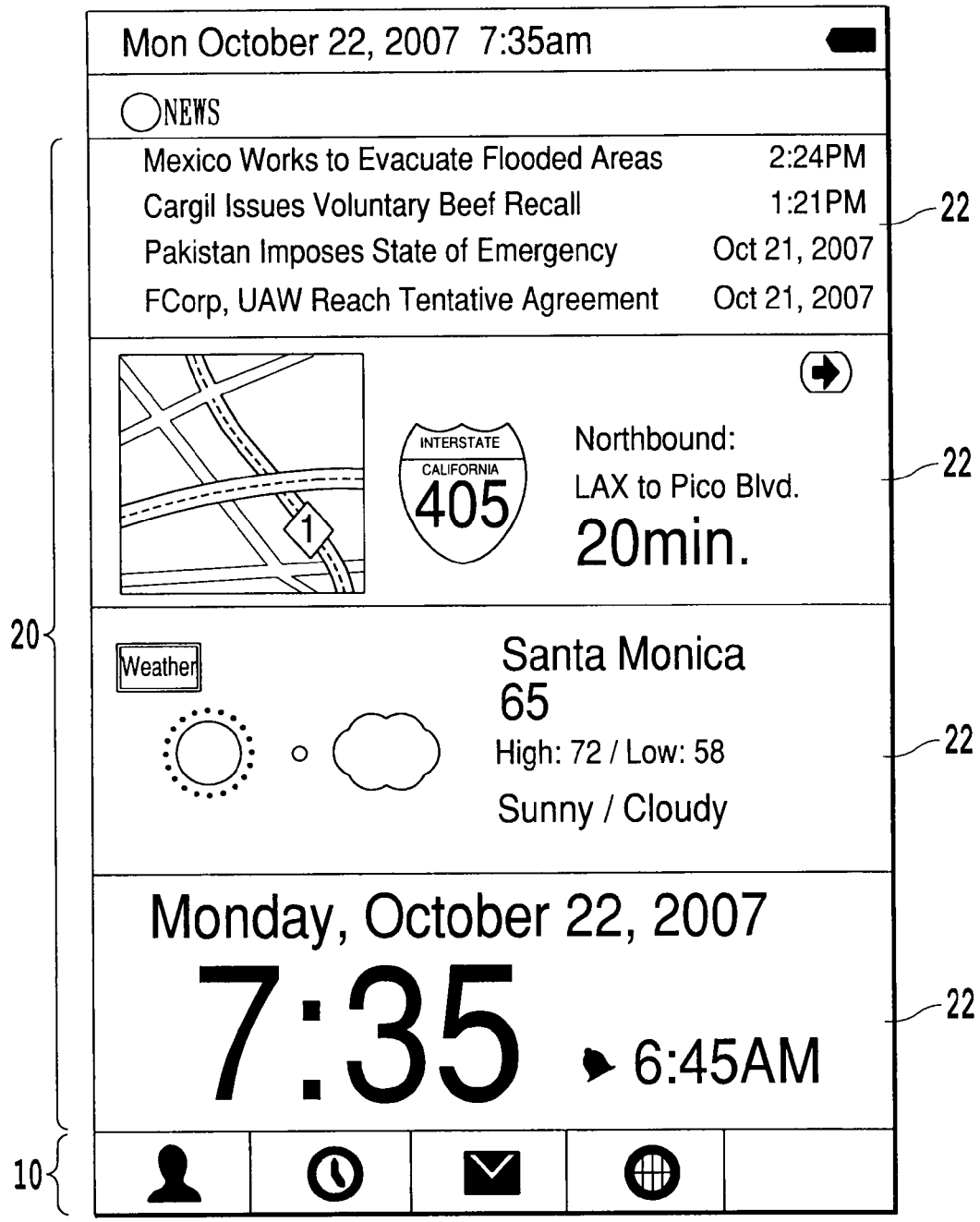
FIG. 9 is a screenshot showing a launcher bar and a widget display area of the present invention.
Figure 10:
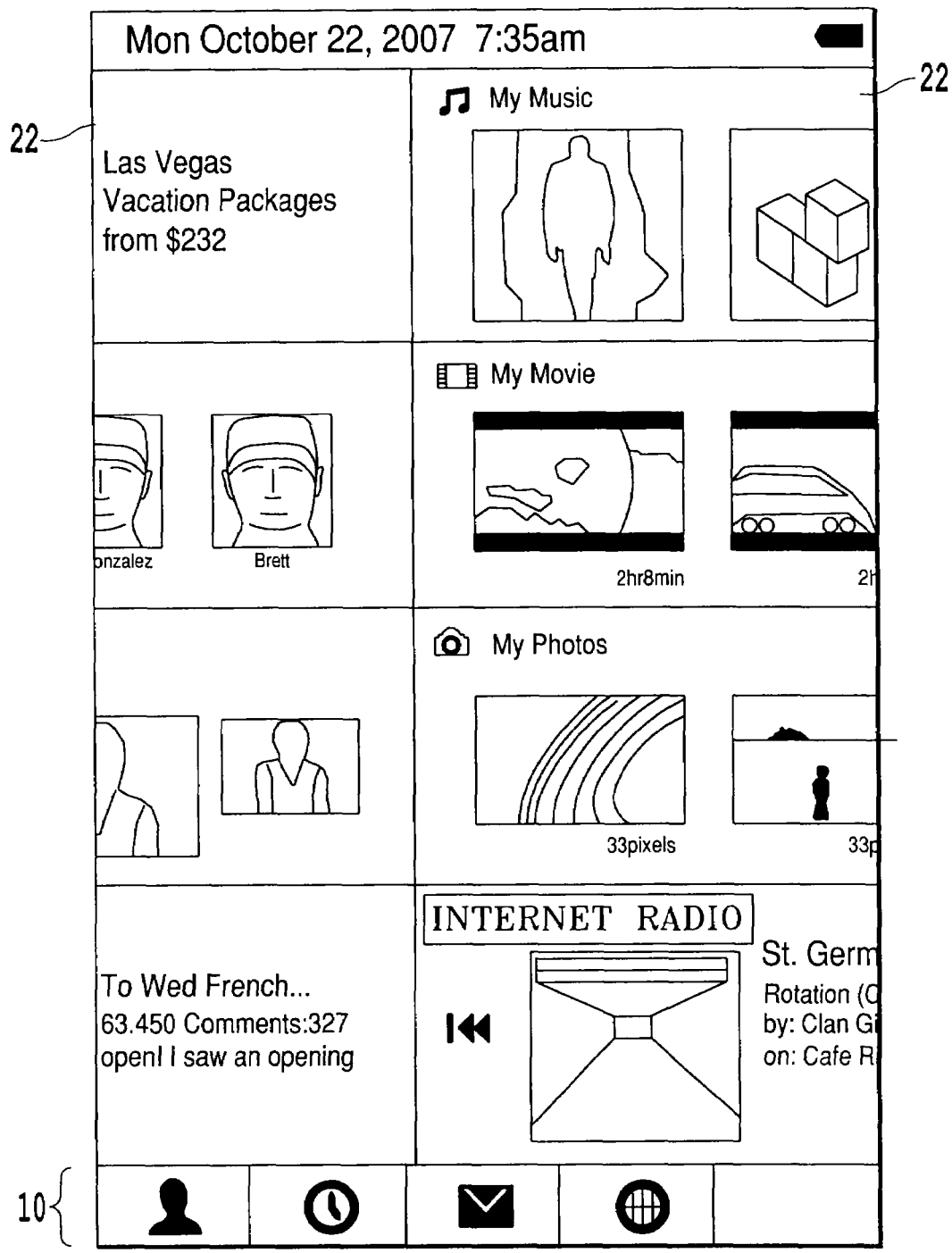
FIG. 10 is a screenshot showing horizontally scrolled widgets of the present invention.
Figure 11:
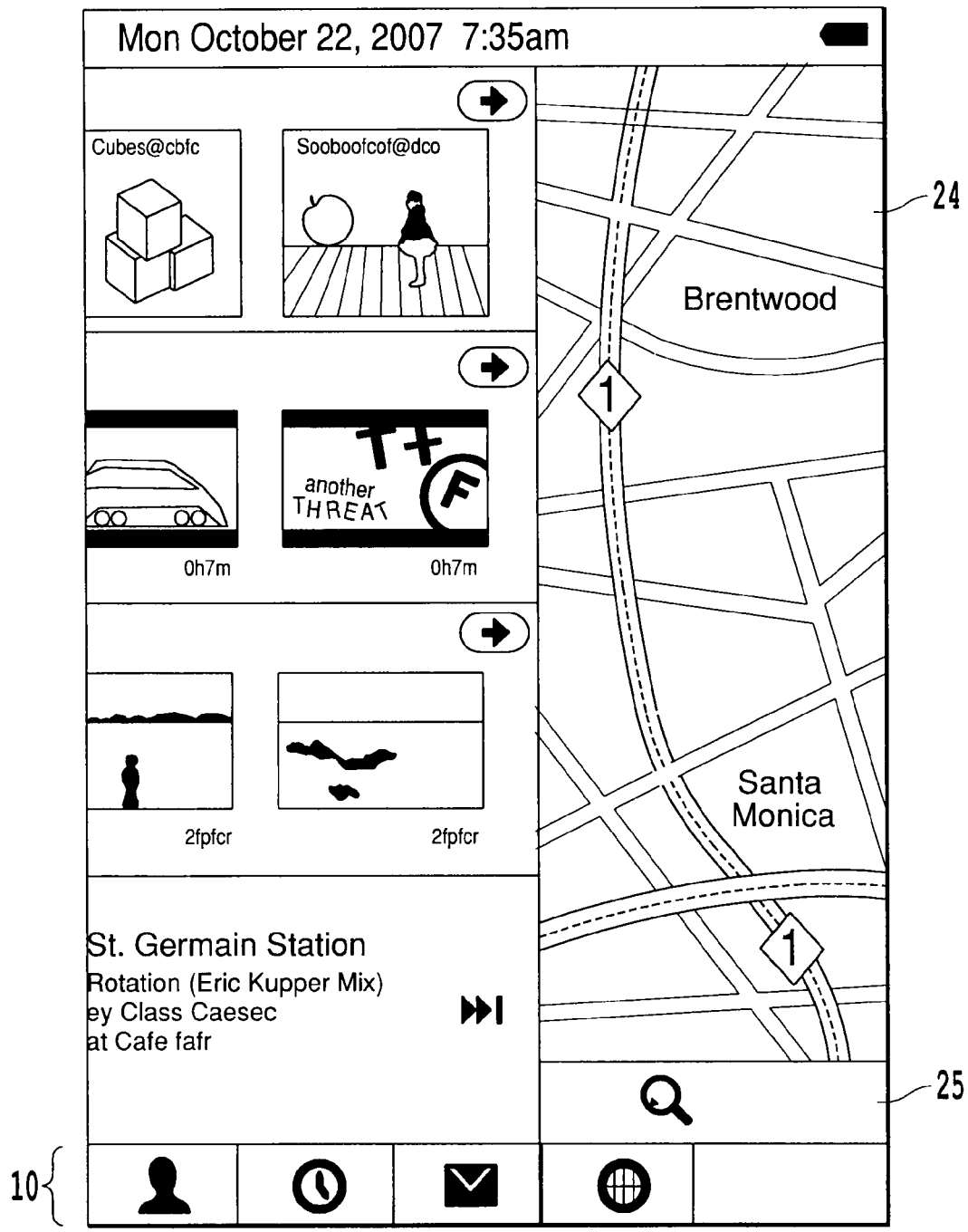
FIG. 11 is a screenshot showing a map display.

FIG. 9 illustrates an embodiment of the present invention including where a main display area is divided into a launcher bar 10 and a widget display area 20 including a plurality of widgets 22. The content of widget display area 20 can be scrolled horizontally, as shown in FIG. 10 to display additional widgets 22. Further, the content of widget display area 20 can also be scrolled horizontally, as shown in FIG. 11, to display a map 24. Map 24 includes icons 25 which allow zooming, rotating, and vertically or horizontally dragging the map 24.

Figure 13:
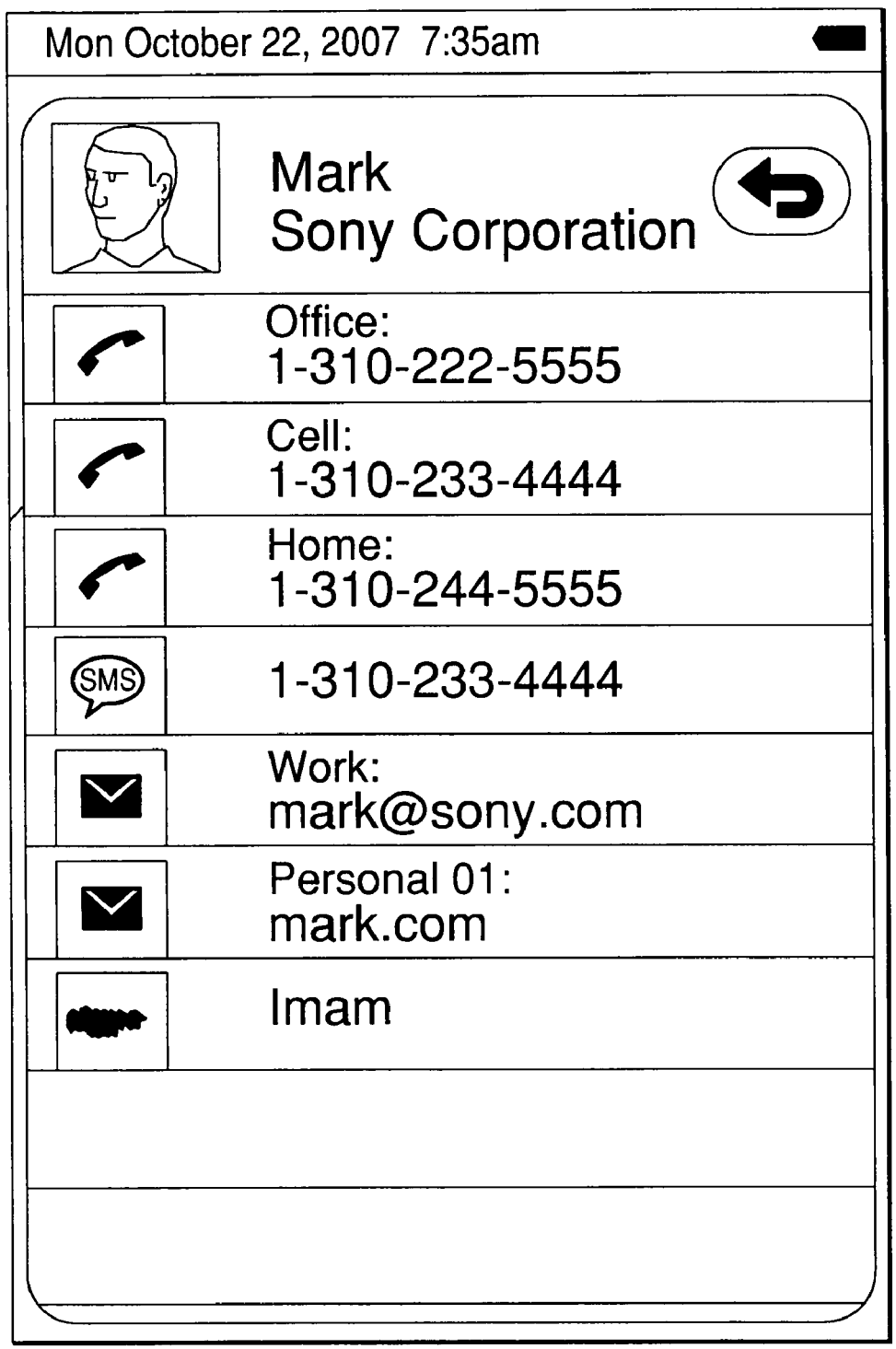
FIG. 13 a screenshot showing detailed information on a single contact.

Launcher bar 10 can be scrolled vertically to reveal information display area 30. Information display area 30 includes information related to the highlighted icon of launcher bar 10. For example, FIG. 12 shows information display area 30 containing a plurality of contact information 32 when contact icon 11 of launcher bar 10 is highlighted. In an embodiment where the apparatus includes a phone function, a contact's phone number can be dialed when the icon including the phone number is clicked on. Further, detailed information regarding a particular contact is displayed when that contact is clicked on, as shown in FIG. 13.

Figure 14:
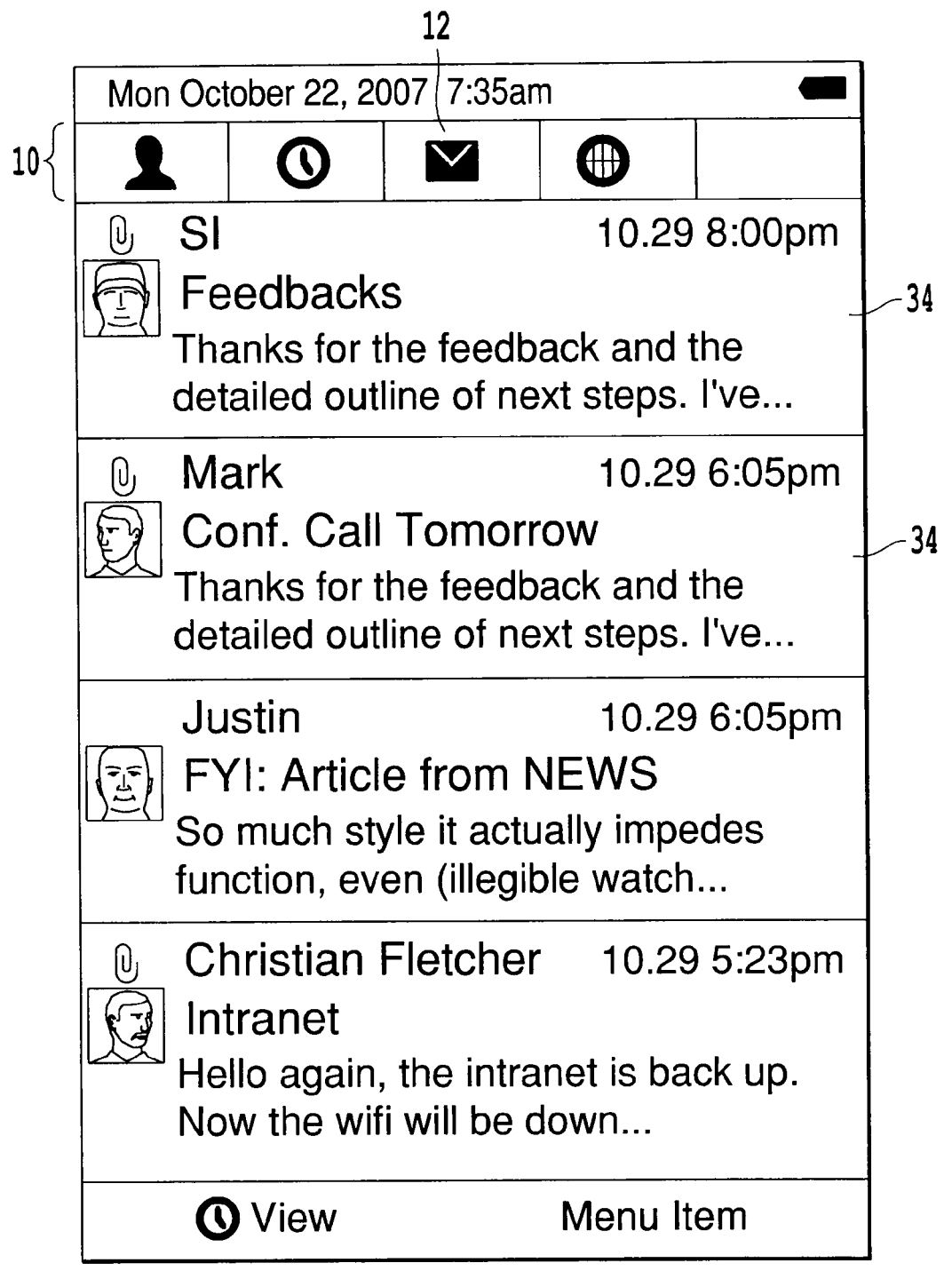
Figure 15:
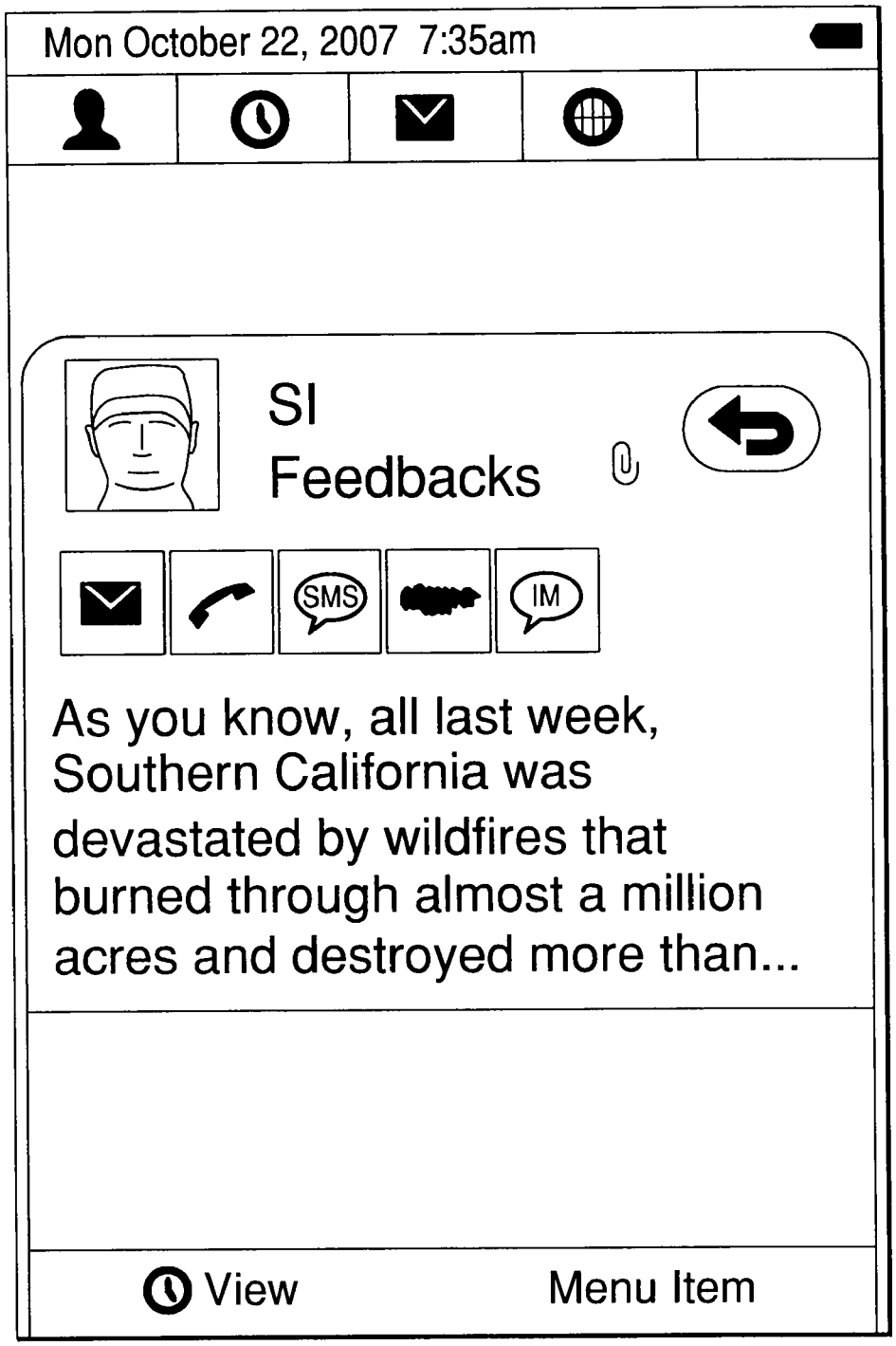
FIG. 15 is a screenshot showing a single e-mail.

FIG. 14 shows a plurality of the e-mails 34 displayed in the information display area 30 when the e-mail icon 12 of launcher bar 10 is highlighted. The content of each e-mail message is displayed when the e-mail is clicked on, as shown in FIG. 15.

Figure 17:
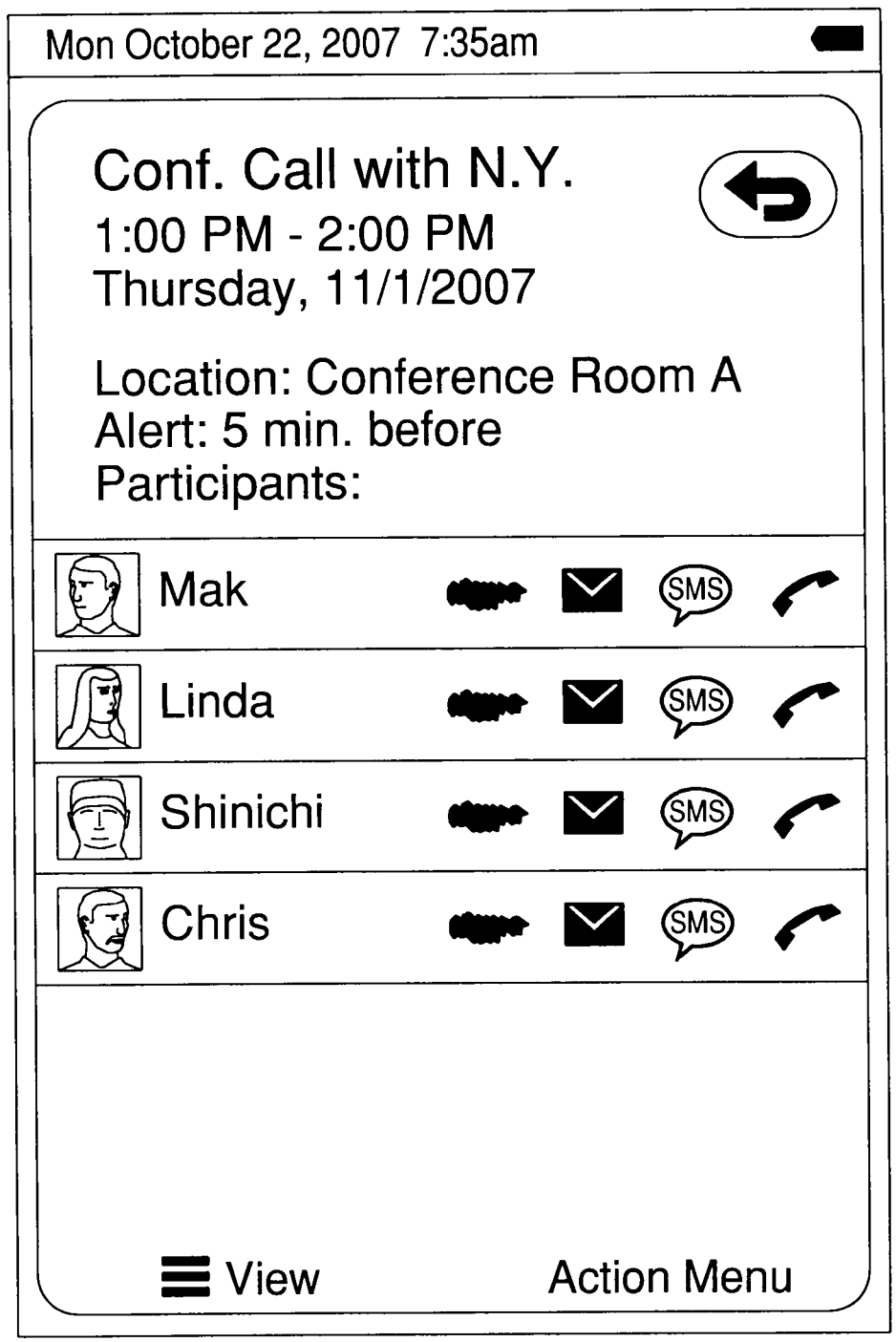
FIG. 17 is a screenshot showing detailed information on a single appointment.

FIG. 16 shows an appointment schedule 36 when clock icon 13 of launcher bar 10 is highlighted. Detailed information regarding a particular appointment is displayed when that appointment is clicked on, as shown in FIG. 17.

Figure 18:
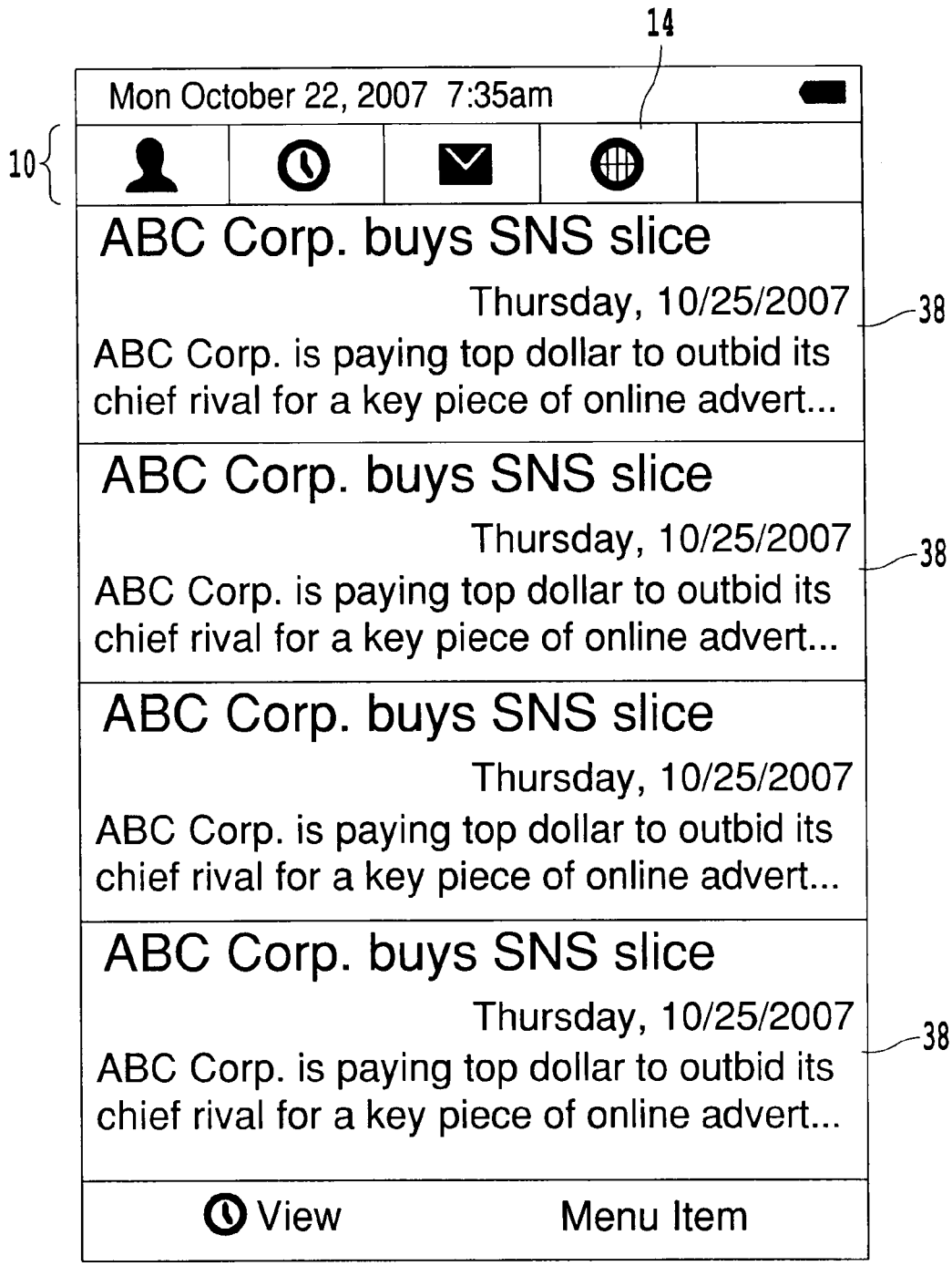
FIG. 18 is a screenshot showing multiple webpage thumbnails.
Figure 19:
FIG. 19 is a screenshot showing detailed information on a single webpage.

FIG. 18 shows a plurality of webpage thumbnails 38 when globe icon 14 of launcher bar 10 is highlighted. The corresponding webpage is displayed when one of the thumbnails 38 is clicked on, as shown in FIG. 19.

Figure 20:
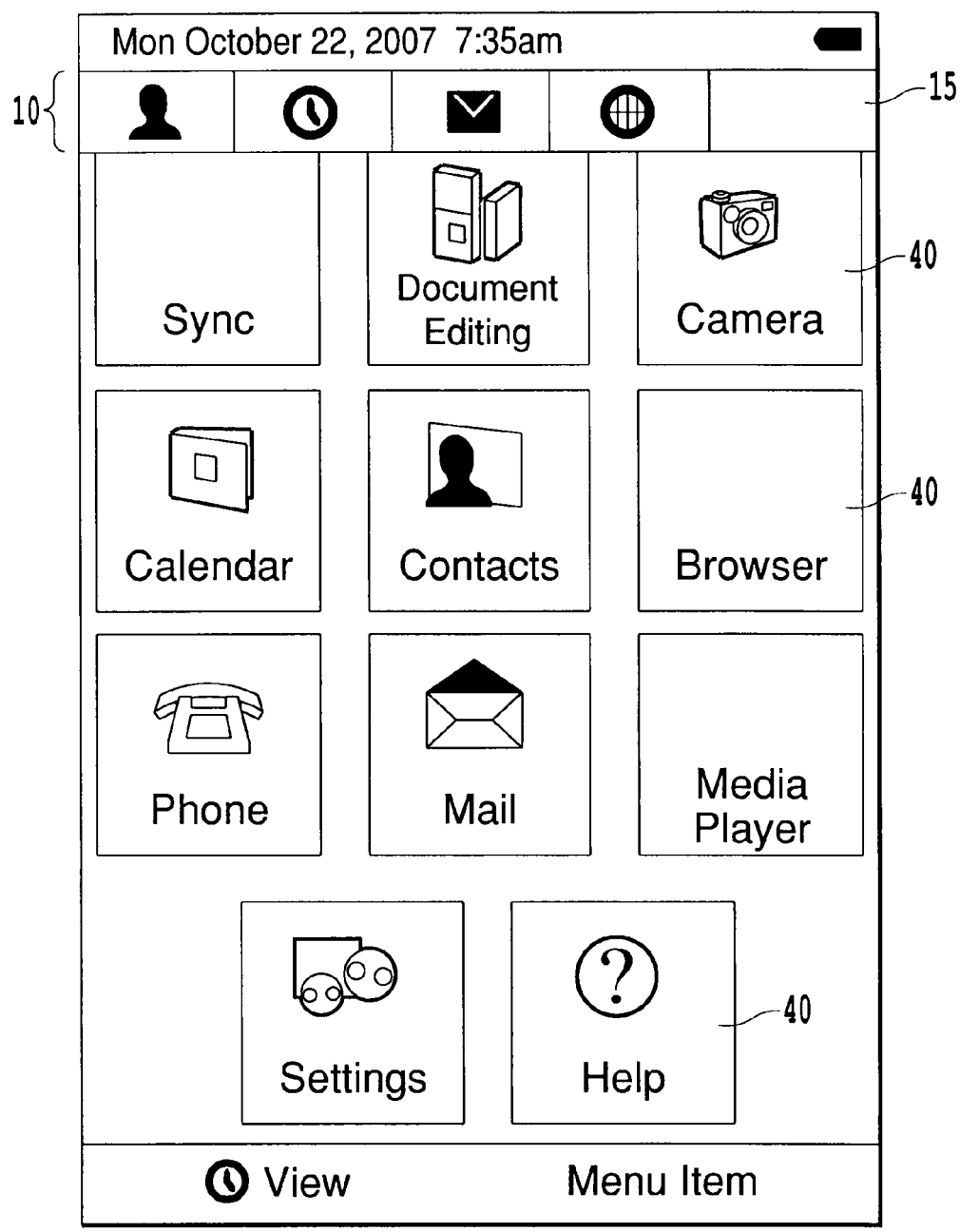
FIG. 20 is a screenshot showing a plurality of applications.

FIG. 20 shows a plurality of applications 40 displayed in information display area 30 when application icon 15 of launcher bar 10 is highlighted. Any of the applications 40 can be launched when the corresponding icon is clicked on.

Figure 21:
FIG. 21 is a screenshot showing the launcher bar near the middle of the display.
Figure 22:
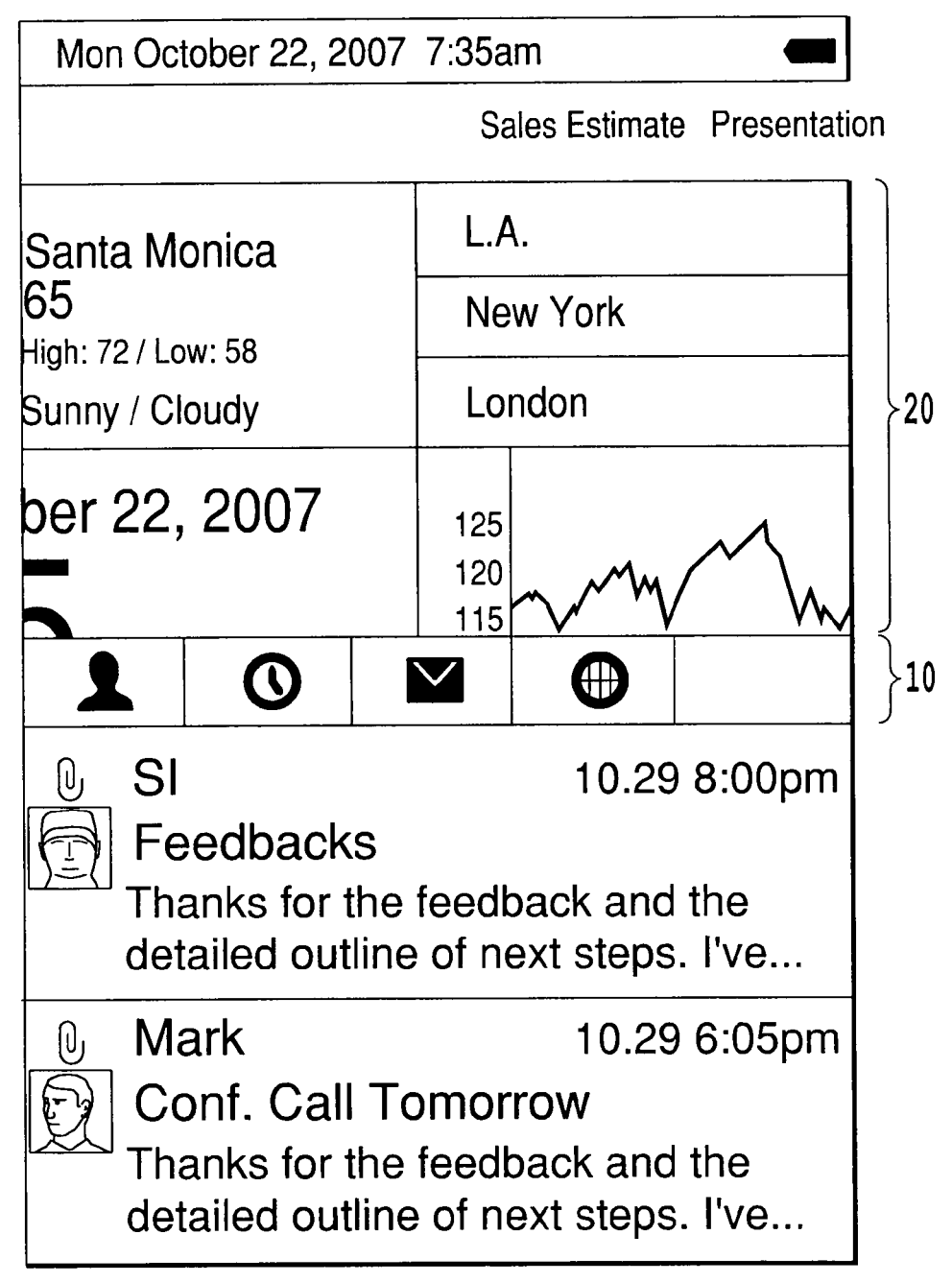

When moving launcher bar 10 vertically, the relative sizes of the widget display area 20 in the information display area 30 are changed. For example, FIG. 9 shows launcher bar 10 at the bottom of the screen such that widget display area 20 takes up most of the main display area. FIG. 12 shows launcher bar 10 at the top of the screen such that information display area 30 takes up most of the main display area. However, launcher bar 10 may be located at any vertical position in the main display area. For example, FIG. 21 shows launcher bar 10 near the middle of the main display area with a widget display area 20 above launcher bar 10 and an information display area 30 below launcher bar 10. Further, information display area 30 and widget display area 20 may be independently scrolled. For example, FIG. 22 shows widget display area 20 being horizontally scrolled independent of launcher bar 10 and information display area 30. FIG. 22 shows information display area 30 being horizontally scrolled independent of launcher bar 10 widget display area 20.

Figure 23:
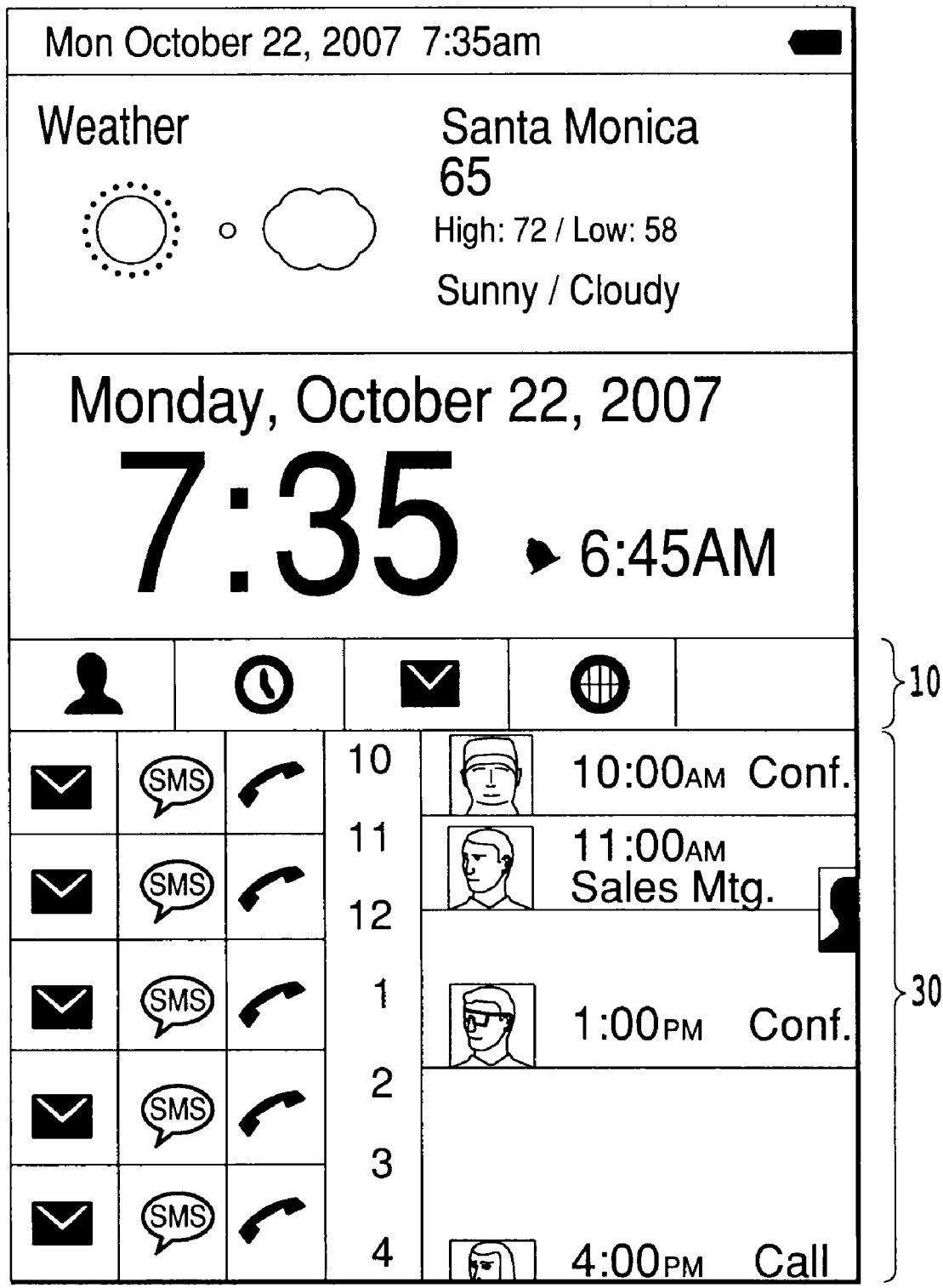
FIG. 23 is a screenshot showing horizontal scrolling of the information area.

In one embodiment, it is possible to show a half-displayed widget, as shown in FIG. 22. However, one embodiment moves launcher bar 10 automatically to show an entire widget when the user stops dragging at the middle of the widget. Therefore, the display control unit determines whether or not the half displayed widget should be displayed, and moves launcher bar 10 automatically to show the entire widget based on the displayed ratio of the half displayed widget. Thus, FIGS. 9 and 23 do not show half-displayed widgets.

Figure 24:
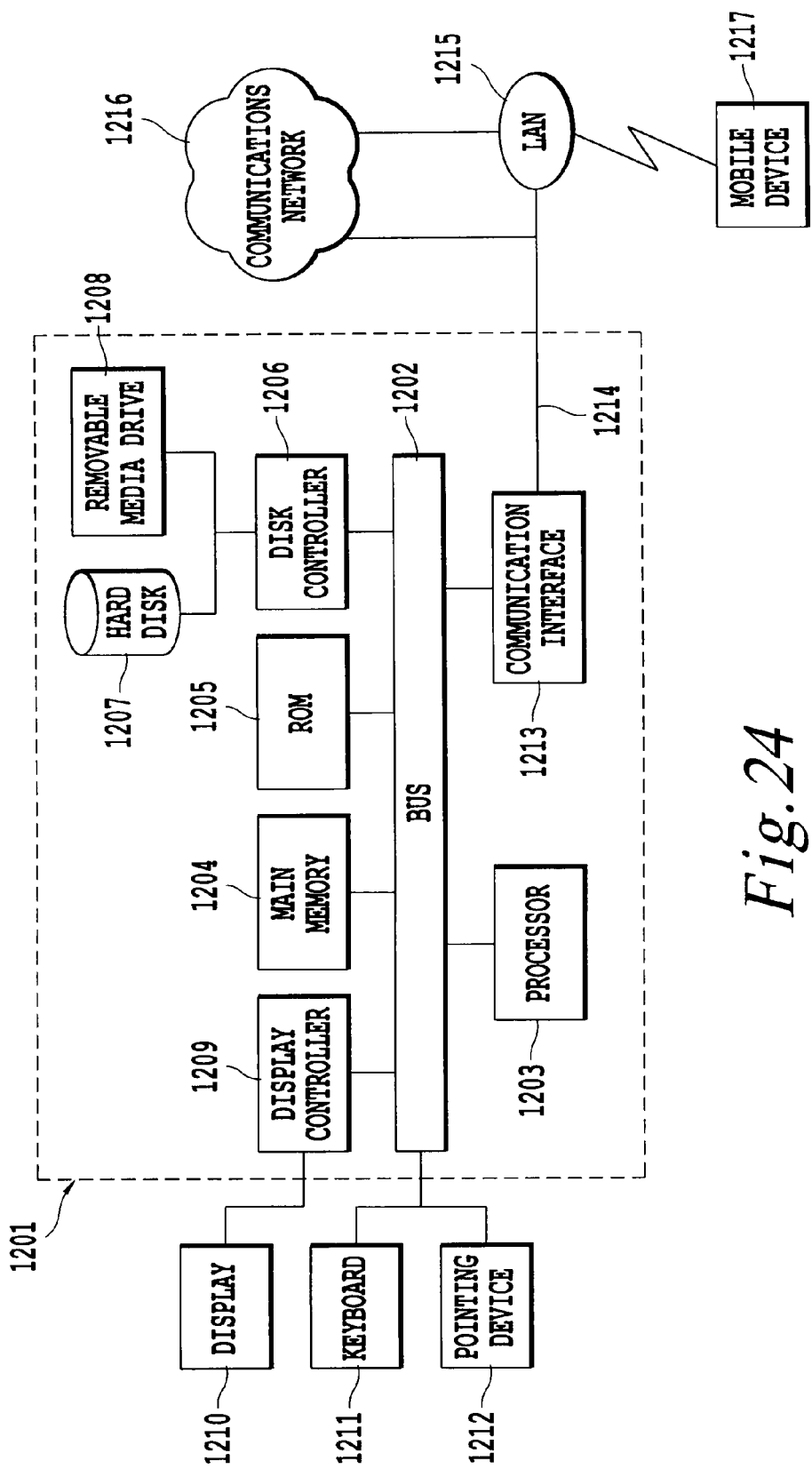
FIG. 24 is a block diagram showing a typical hardware configuration of the information-processing apparatus 11.

FIG. 24 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a LCD or plasma display, for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. When the remote pointing device is used, the apparatus 1, generates a pointer overlaid on the GUI, so the user knows the location of the pointer when choosing to either select an item or "flick" the display to cause a scrolling operation. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Figure 25:
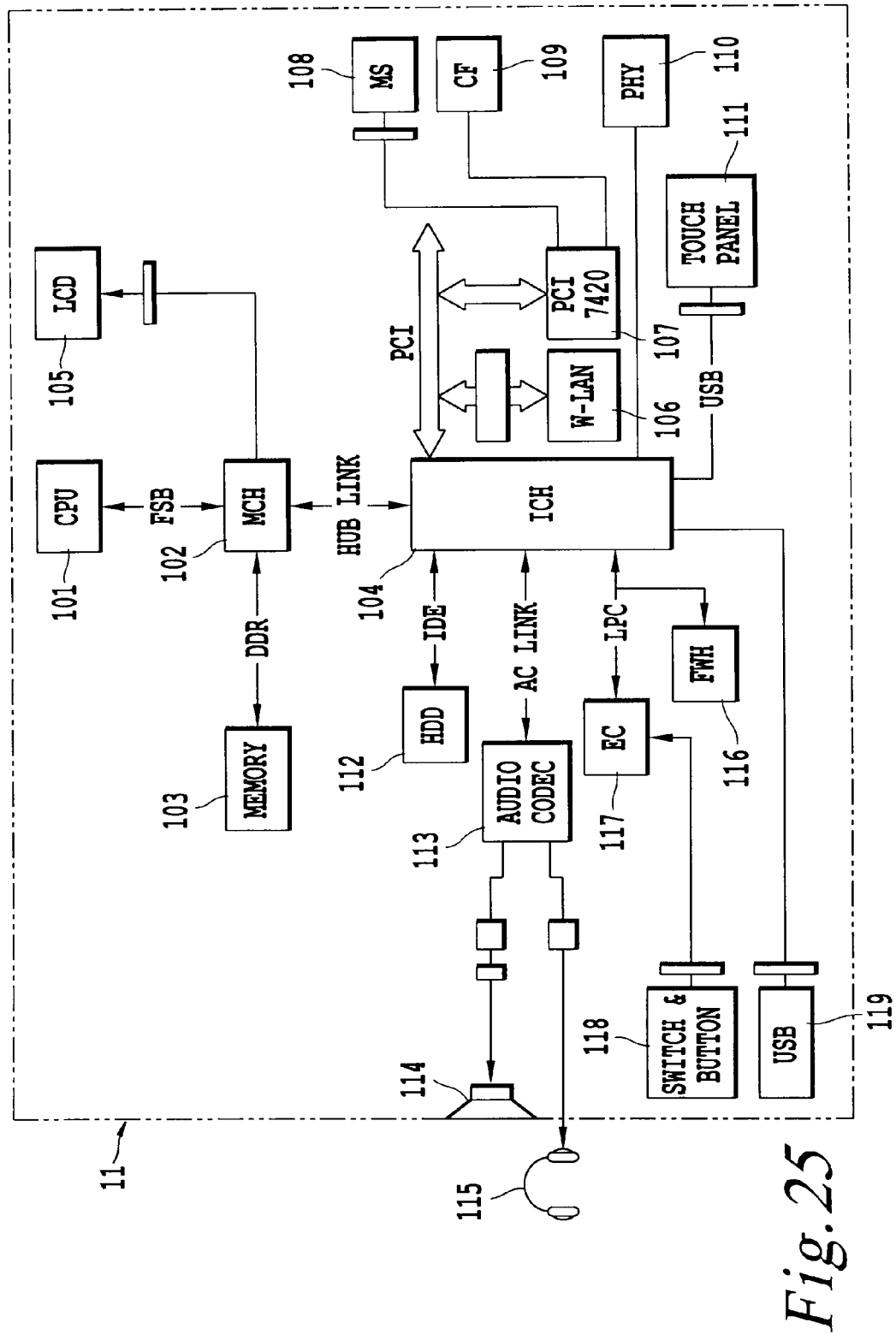
FIG. 25 is a block diagram showing different hardware and/or software components that may be used to implement the present invention.

FIG. 25 is a block diagram showing a typical hardware configuration of the information-processing apparatus 11.

As shown in the figure, a CPU 101 serving as a control nucleus is connected to a control unit 102 through an FSB (Front Side Bus). The control unit 102, other control units and other devices form the processing unit 3 described above. The other control units and other devices will be described later. The control unit 102 is a component for executing control of a main memory 103 and graphics functions. The control unit 102 mainly plays a role for processing a large amount of data at a high speed. In AT compatibility, the control unit 102 is referred to as a north bridge. In this embodiment, the control unit 102 is connected to the CPU 101, the main memory 103, a control unit 104 and a graphic display unit 105 such as a liquid-crystal display device.

The control unit 104 is a component mainly for controlling elements such as control devices provided for a user interface and for controlling bus links of devices. In the AT compatibility, the control unit 104 is referred to as a south bridge. In an ISA bridge to the PCI, the control unit 104 plays a role of a bridge between a PCI (Peripheral Component Interconnect) bus and a low-speed bus such as an ISA (Industry Standard Architecture) bus. The control unit 104 has the functions of controllers such as an ISA controller and an IDE (Integrated Drive Electronics) controller.

The PCI bus is connected to a radio LAN (or a W-LAN) serving as a radio communication device 106 and a device 107 for connection with and controlling an external memory and an external apparatus. As the external memory, a semiconductor memory device can be employed. The device 107 is provided with a control device 108 for reading out and writing data from and into a stick-shaped storage medium and a control device 109 for reading out and writing data from and into a card-shaped storage medium. In addition, the device 107 has the function of a connection interface with an external apparatus. An example of the connection interface is an interface conforming to IEEE 1394 defining specifications of hardware for adding a serial device to a computer.

The control unit 104 is connected a LAN (Local Area Network) connection device 110 and a USB (Universal Serial Bus) port connected to the touch panel 111 to detect user operation. The CPU 101 receives signal of user operation from touch panel 111 and determines such as whether or not user operation is to move the launcher bar or to press an icon on it. If CPU 101 determines that user operation is to move the launcher bar, then CPU 101 changes the display, such as, a ratio of widget display region 20 and information display region 30, or displays corresponding information in information display area based on the user operation. Furthermore, CPU 101 determines whether vertical scrolling or horizontal scrolling is selected, or compares the current time or current position information with time or position information in setting information based on the program stored on storage unit 116. These processes are described hereafter.

An auxiliary storage unit 112 is a drive for driving a disk such as a magnetic or optical disk. In this embodiment, the auxiliary storage unit 112 is a drive for driving a large-capacity storage medium such as a hard disk. The auxiliary storage unit 112 is connected to the control unit 104, which serves as an internal IDE controller.

An audio codec 113 connected to the control unit 104 is a component for outputting an audio signal obtained as a result of a digital-analog conversion process to a component such as a speaker 114 or head phones 115. The audio signal represents a voice or a sound. In an apparatus configuration including a microphone, the audio codec 113 carries out a process to convert audio input data into a digital one.

A storage unit 116 is a memory for storing a control program for driving a computer. The storage unit 116 is connected to the control unit 104 and a control unit 117 by using an LPC (Low Pin Count) bus or the like.

The control unit 117 is a general-purpose unit for controlling a variety of signals. As the control unit 117, for example, an EC (Embedded Controller) is employed. The control unit 117 also controls the power supply of the information-processing apparatus 11 and additional functions of the information-processing apparatus 11. In the case of a portable information-processing apparatus, the control unit 117 is a microcomputer. It is to be noted that, by modifying a control program stored in the storage unit 116, the method for controlling the computer can be changed.

An operation section 118 including the operation element 17 provided on the main body of the information-processing apparatus 11 outputs a signal to the control unit 117. As a connection section 119 for connecting an external apparatus to the information-processing apparatus 11, a USB connector is provided on the main body of the information-processing apparatus 11. The USB connector 119 is also connected to the control unit 104.

It is to be noted that a power-supply section not shown in the figure receives a commercial power-supply voltage from an AC adaptor. As an alternative, the information-processing apparatus 11 may be powered by a battery pack serving as DC power supply. Typically, the battery pack includes secondary batteries or fuel batteries.

Obviously, numerous modifications and variations of the present invention are possible in light of the above teachings. It is therefore to be understood that within the scope of the appended claims, the invention may be practiced otherwise than as specifically described herein.

The invention claimed is:

1. An information processing apparatus comprising:
a display unit configured to display a dividing region dividing a main display region into two sub regions;
a control unit, including a processor, configured to control said display unit to display a plurality of icons in said dividing region, to change position of said dividing region in said main display region based on user input, to display, when an icon of said plurality of icons is selected, information corresponding to said icon in at least one of the sub regions,
to automatically display a first set of widgets at a first time of a day each day and to automatically display a second set of widgets at a second time of day each day, the first set of widgets being different than the second set of widgets,
to display widget information including a plurality of widgets in one sub region of said two sub regions, and
to automatically move the dividing region to a location where every displayed widget is entirely visible when a user moves the dividing region to a location where one widget is only partially displayed; and
a detector configured to detect a gesture of a user with respect to said main display region,
wherein said control unit is configured to control said display unit to change information in said sub region based on said gesture,
wherein said control unit is configured to define a plurality of said widget information and said display unit is configured to display one widget information of said plurality of widget information in one sub region,
wherein said control unit is configured to control the display unit to display other widget information as a substitute for said one widget information when said detector is configured to detect a flick gesture by the user with respect to said one sub region.

2. An information processing apparatus according to claim 1, wherein said control unit is configured to control the display unit to display the plurality of widgets selected based on user input.

3. An information processing apparatus according to claim 1, wherein said display unit is configured to display a plurality of buttons, each button corresponding to one widget information, and said control unit is configured to control, when said detector detects that one button is selected, the display unit to display other widget information corresponding to said selected button, as a substitute for said one widget information.

4. An information processing apparatus according to claim 1, further comprising; an acquisition unit configured to acquire current parameter information, wherein said control unit is configured to select said one widget information based on comparison result of said current parameter information and a plurality of predetermined parameter information which each correspond to a plurality of predetermined widget information.

5. An information processing apparatus according to claim 4, wherein said parameter information is time information and/or location information.

6. An information processing apparatus according to claim 1, wherein said control unit is configured to control the display unit to display one fixed information of a plurality of setting disable fixed information in an other sub region.

7. An information processing apparatus according to claim 6, wherein said plurality of icons represents a plurality of fixed information displayed in said sub region.

8. An information processing apparatus according to claim 6, wherein said control unit is configured to move said dividing region to the top of said main display region and to display said one fixed information based on the detection of selection of the icon when said display unit displays said dividing region in the bottom of said main display region.

9. An information processing apparatus according to claim 6, wherein said control unit is configured to control the display unit to display other fixed information as a substitute for said one fixed information based on the detection of a flick gesture by said user in said other sub region detected by said detector.

10. An information processing apparatus according to claim 1, wherein said display unit is configured to display at least one widget including continuously updated information.

11. An information processing apparatus according to claim 10, wherein said display unit is configured to display at least one widget including continuously updated weather information.

12. An information processing apparatus according to claim 1, wherein said display unit is configured to display the first set of widgets related to traffic information at the first time early in a morning each day, and to display the second set of widgets related to sports information at the second time in an evening each day.

* * * * *